United States Patent
Yoo et al.

(10) Patent No.: US 6,383,604 B1
(45) Date of Patent: May 7, 2002

(54) KEYTOP SHEET USING FILM AND ITS MANUFACTURING METHOD

(75) Inventors: Sung Tae Yoo, Choongcheongbuk-Do; Chul Jin Kim, Kyungki-Do, both of (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/413,507

(22) Filed: Oct. 6, 1999

(30) Foreign Application Priority Data

Dec. 30, 1998 (KR) ............................. 98-28054

(51) Int. Cl.[7] .............. B32B 3/10; H04M 1/00; B29B 7/00
(52) U.S. Cl. ............... 428/137; 428/172; 428/195; 264/328.1; 200/512; 379/368
(58) Field of Search ............. 428/172, 195, 428/137, 167; 264/132, 241, 328.1; 200/275, 341, 513; 156/244.16, 277; 379/368, 422; 362/24

(56) References Cited

U.S. PATENT DOCUMENTS 5,176,945 A * 1/1993 Brayton ............... 428/136
6,103,346 A * 8/2000 Nakajo et al. ........... 428/172

* cited by examiner

Primary Examiner—Donald J. Loney
(74) Attorney, Agent, or Firm—Fleshner & Kim, LLP

(57) ABSTRACT

In the present invention, a molding process of keptops is performed by inserting a previously silk-printed thin film into a mold. Therefore, it is possible to implement a small sized and light product by connecting a plurality of keytops using a film, and a tactile feel of a user is increased. In addition, in the present invention, since a silk printing process is not required, the productivity of a keytop sheet is enhanced, and it is possible to decrease the defect rate of the product compared to the conventional art.

13 Claims, 6 Drawing Sheets

KEYTOP SHEET USING FILM AND ITS MANUFACTURING METHOD

BACKGROUND OF THE INVENTION

1. Field of the Invention

The present invention relates to a key-top sheet for a push button switch, and in particular to an in-mold type keytop sheet using a film.

2. Description of the Background Art

Generally, a push button switch is used as a control panel for an electronic device. A keytop sheet of the push button switch is fabricated based on a molding process and a silk printing process. In order to fabricate the keytop sheet, there are provided an upper mold having a plurality of cavities for forming a keytop and a lower mold having a cavity for forming a frame and a pushing portion. In this state, the upper mold and the lower mold are engaged, and a high temperature and pressure transparent injection material such as polycarbonate, resin, etc is implanted into an underside of the lower mold via a pin gate provided on the underside. As a result, as shown in FIG. 1, the keytop sheet becomes one part by connecting a plurality of keytops 2, for example, 15 keytops(in the case of a telephone, 12 keytops) via a connection rib 1(hereinafter called as runner) based on the molding process.

When the keytops 2 are formed by the molding process, a silk printing process is performed. In this case, a keytop sheet is generally fabricated by printing a certain character or numeral number on an underside of each keytop 2 which are processed based on the molding process. At this time, the silk printing is performed more than twice. Generally, the number of the silk printing is determined depending on the number of printing colors. As shown in FIG. 2, a keytop sheet 3 having a structure in which a plurality of keytops are connected by the runner 1 is fabricated.

The runner 1 connects a plurality of keytops during a molding process and forms the keytops as one part. Since the runner is formed of the same material as the keytops, namely, a transparent injection material, the elasticity of the runner is not good. In addition, a user pushes a certain keytop in a state that the completed keytop sheet is inserted into a product, since the keytops are connected by the runner, neighboring keytops are slightly pushed. Therefore, when the conventional keytop sheet is actually adapted to a product, there is a problem in that a tactile feel(a feel when a user pushes a button) is decreased.

In addition, as shown in FIG. 3, in the conventional keytop sheet, the runner has a thickness of about 0.8~1.2 mm. Therefore, when the keytop sheet is actually adapted to a product, the entire thickness of a product is increased due to the thickness (1.2 mm) of the runner.

Furthermore, in the conventional art, since a silk printing process is additionally required when fabricating the keytop sheet, the cycle time of the keytop sheet is increased. The number of the silk printing process is increased depending on the number of printing colors. Therefore, the defected products may be increased due to the increased number of printing processes.

SUMMARY OF THE INVENTION

Accordingly, it is an object of the present invention to provide an in-mold type keytop sheet which is capable of enhancing a reliability and productivity of a product by performing a molding process for a keytop by inserting a previously silk-printed thin film into a mold.

It is another object of the present invention to provide an in-mold type keytop sheet which is capable of decreasing the thickness and weight of a product using a thin film as a rib for connecting keytops.

It is still another object of the present invention to provide an in-mold type keytop sheet which makes it possible to enhance a tactile feel of a user by connecting a plurality of keytops by a thin film.

To achieve the above objects, there is a provided an in-mold type keytop sheet which is implemented by connecting a plurality of keytops using a film based on a molding process for the keytops after a previously silk-printed thin film into a mold.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
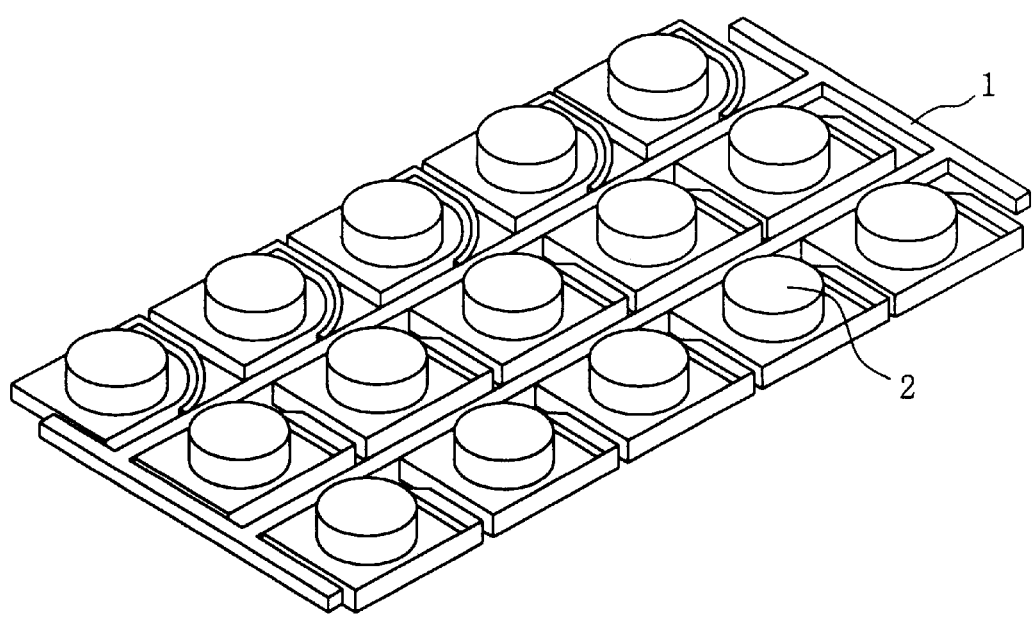
FIG. 1 is a perspective view illustrating a conventional keytop sheet.
Figure 2:
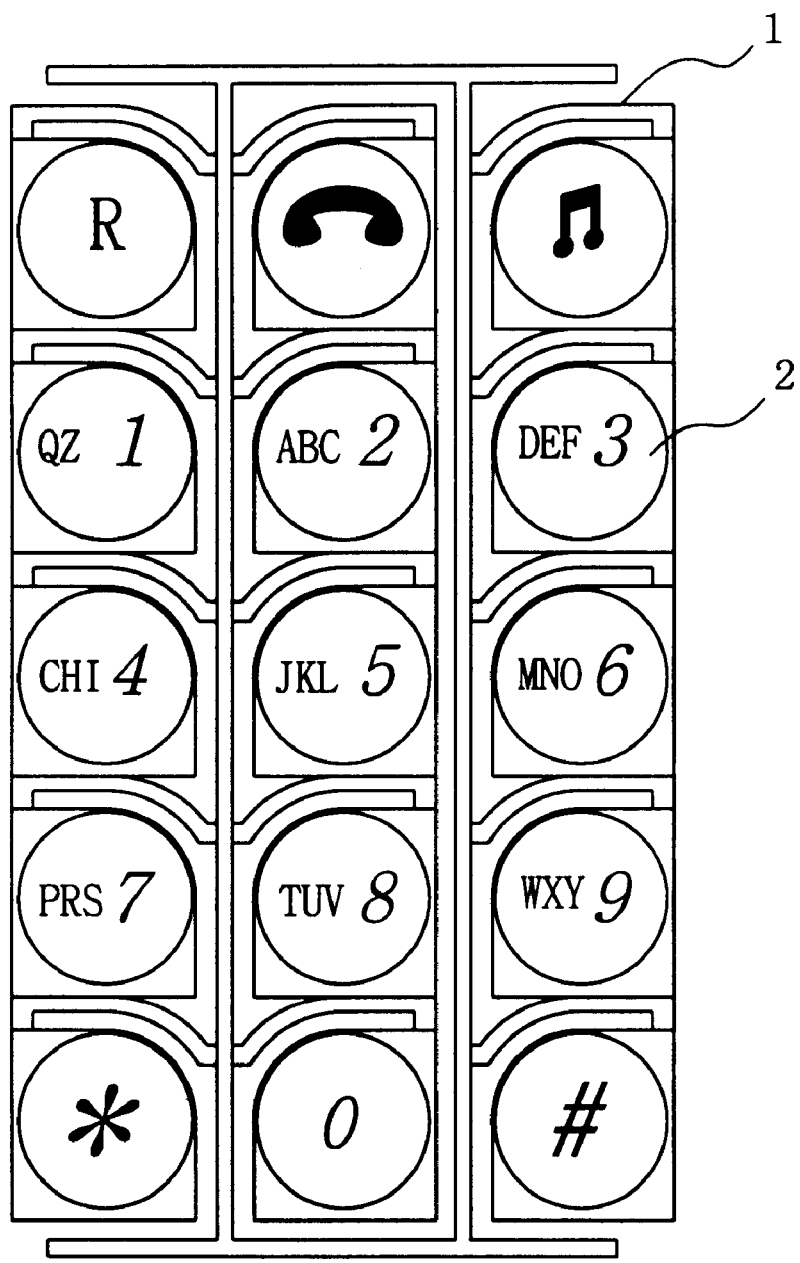
FIG. 2 is a plan view illustrating a kettop sheet after a silk printing process is performed.
Figure 3:
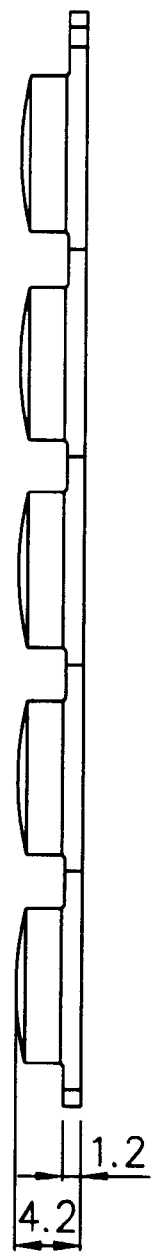
FIG. 3 is a side view illustrating a keytop sheet after a molding process or silk printing process is performed.
Figure 4:
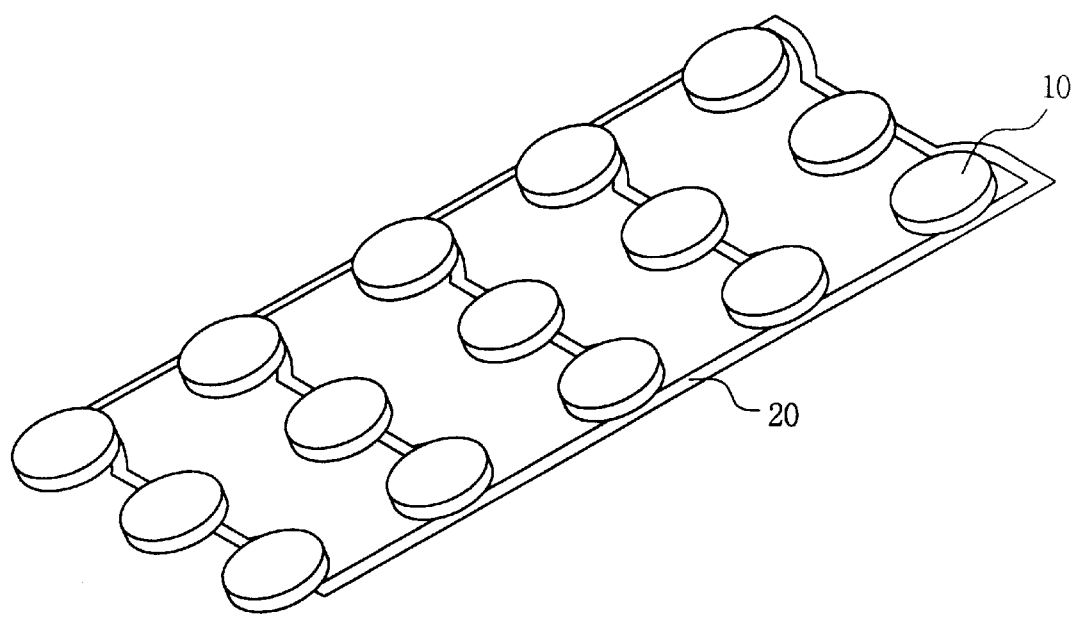
FIG. 4 is a perspective view illustrating an in-mold type keytop sheet according to the present invention.

FIG. 4 is a perspective view illustrating an in-mold type keytop sheet using a film according to the present invention. As shown therein, 15 keytops 10 are connected by a 0.2 mm thin film 20.

Figure 5:
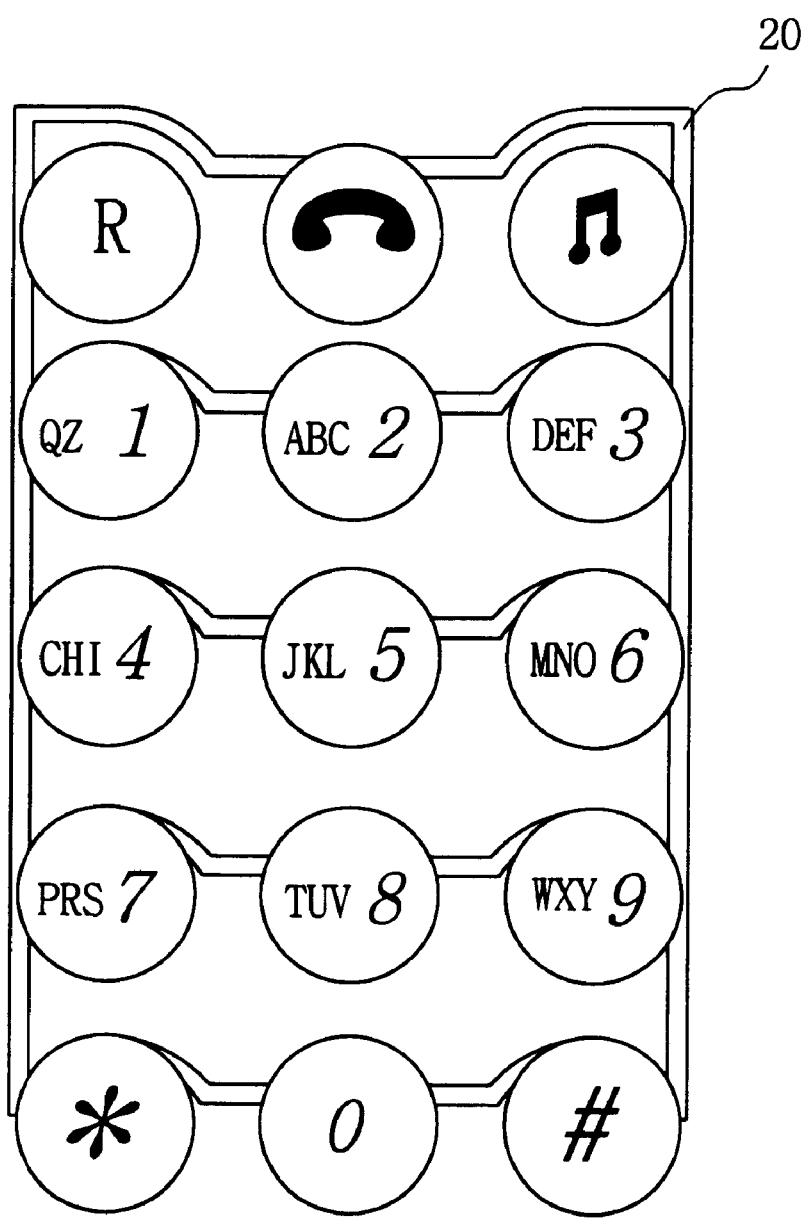
FIG. 5 is a plan view illustrating the shape of a silk-printed film and a keytop sheet after a molding process is performed according to the present invention.

As shown in FIG. 5, a certain character or numeral number is silk-printed on a topside or underside of the film 20. The film is provided in a roll form during the keytop molding process. The film 20 is cut in a certain form excluding a portion corresponding to the keytop 10 and the connection rib 30. At this time, the connection rib 30 is preferably formed in a lattice shape for each button. In the present invention, since the keytops are designed to be integrally inserted in a certain apparatus such as a telephone set, there is a small limit for the area and shape of the connection rib 30.

Therefore, in order to fabricate the keytop sheet, the rolled film is inserted onto the lower mold, in detail, between the upper mold and the lower mold. A plurality of cavities are formed on the upper mold for forming the keytops. The lower mold has a plane shape. When the film is inserted, the upper mold and the lower mold are engaged. A high temperature and pressure transparent injection material is implanted via a pin gate formed on the upper and lower sides of the upper mold. As a result, the silk-printed film is bonded to the underside of the keytop, so that a keytop sheet connected by a plurality of keytops is fabricated as shown in FIG. 4.

Figure 6:
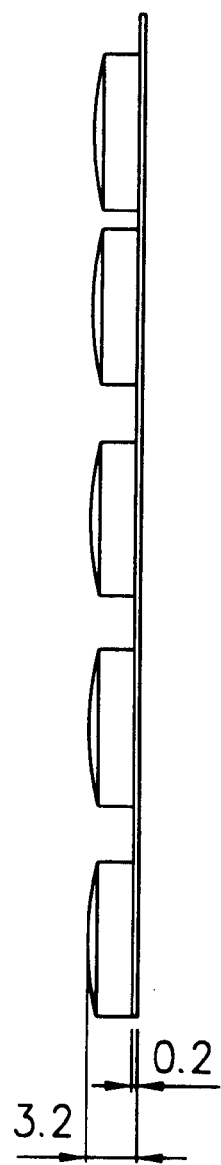
FIG. 6 is a side view illustrating a keytop sheet after a molding process is performed.

As described above, in the present invention, a silk printing process is not required by fabricating the keytop sheet by only the molding process. In addition, since a plurality of keytops are connected by a 0.2 mm thick film, as shown in FIG. 6, it is possible to decrease the thickness of a keytop sheet by about 1 mm compared to the conventional art. Therefore, in the case when the keytop sheet according to the present invention is provided in a telephone, it is possible to increase a tactile feel of a user based on a film having a better elasticity.

The present invention is not limited to a telephone set(a general type telephone set, a cellular phone, and the like).

As described above, in the present invention, since a film which is silk-printed by a certain character or numeral number is inserted into the mold, and a molding process is performed, the silk printing process is not required. Therefore, the cycle time of the keytop sheet is decreased, and the productivity of the product is increased, and the rate of the defected product which occurs by the conventional silk printing process is decreased.

In addition, it is possible to implement a small sized and light product by connecting a plurality of keytops using a thin film, and a tactile feel of a user is enhanced by a certain elastic of the film.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A keytop sheet, comprising:
    a film with a plurality of characters printed thereon; and
    a plurality of keytops formed on and connected by the film, wherein the film is removed except for portions contacting with bottom surfaces of the plurality of keytops and portions forming connection ribs that connect the plurality of keytops.

2. The sheet of claim 1, wherein each character of said plurality of characters is attached on an underside of each respective keytop.

3. The sheet of claim 1, wherein said connection rib is formed in a lattice shape in such a manner that the connection rib passes through the keytop sheet one time.

4. The keytop sheet of claim 1, wherein the plurality of characters are printed by a silk-screening process.

5. The keytop sheet of claim 1, wherein the plurality of keytops are substantially transparent.

6. The keytop sheet of claim 1, wherein a thickness of the keytop sheet is approximately 3.2 mm.

7. The keytop sheet of claim 1, wherein the thickness of the film is approximately 0.2 mm.

8. A method for fabricating a keytop sheet, comprising:
    positioning a printed film on a flat lower mold;
    attaching an upper mold having a plurality of cavities for forming keytops to the lower mold; and
    injecting a transparent material through a pin gate provided at one side of the upper mold, wherein the printed film contains art in a pattern corresponding to where the keytops are to be formed.

9. The method of claim 8, wherein said connection ribs are formed in a lattice shaped in such a manner that the connection ribs pass through the keytop sheet one at a time.

10. The method of claim 8, wherein said transparent injection material is a polycarbonate and said film is formed of a resin material.

11. The method of claim 8, further comprising printing the film using a silk-screening process.

12. The method of claim 8, wherein a thickness of the keytop sheet is approximately 3.2 mm.

13. The method of claim 8, wherein a thickness of the film is approximately 0.2 mm.

* * * * *